(12) United States Patent
Matsunuma

(10) Patent No.: US 6,869,145 B2
(45) Date of Patent: Mar. 22, 2005

(54) SEATBACK FRAME FOR VEHICLE SEAT

(75) Inventor: Noriyoshi Matsunuma, Kanagawa-ken (JP)

(73) Assignee: Johnson Controls Automotive Systems Corporation, Kanagawa-ken (JP)

(*) Notice: Subject to any disclaimer, the term of this patent is extended or adjusted under 35 U.S.C. 154(b) by 0 days.

(21) Appl. No.: 10/927,930

(22) Filed: Aug. 27, 2004

(65) Prior Publication Data
US 2005/0035647 A1 Feb. 17, 2005

Related U.S. Application Data

(63) Continuation of application No. 10/097,236, filed on Mar. 13, 2002, now Pat. No. 6,817,672.

(30) Foreign Application Priority Data

Mar. 23, 2001 (JP) ....................................... 2001-085268

(51) Int. Cl.[7] ............................................... B60N 2/44
(52) U.S. Cl. .................................. 297/452.18; 297/483
(58) Field of Search ........................ 297/188.04, 217.1, 297/468, 483, 474, 482, 486, 452.18, 452.2

(56) References Cited

U.S. PATENT DOCUMENTS
5,447,360 A * 9/1995 Hewko et al. .......... 297/452.18

FOREIGN PATENT DOCUMENTS
EP 590237 A1 * 4/1994 ............ B60N/2/44

* cited by examiner

Primary Examiner—Peter M. Cuomo
Assistant Examiner—Stephen D'Adamo
(74) Attorney, Agent, or Firm—Foley & Lardner LLP

(57) ABSTRACT

In a seatback frame for a vehicle seat having a seatback and a seat cushion and equipped with a seat belt of a three-point type, a pipe frame formed along an external shape of the seatback and a vertically extending tower frame located in the seatback at the same side as a belt-through member of the seat belt of the three-point type and fixedly connected to the pipe frame are provided. The tower frame includes an outer side bracket, an inner side bracket, both of which are formed of vertically extending, elongated metal sheets each formed in a substantially C-shaped cross section and both of which are coupled to one another in abutting engagement with one another to form an internal space, and an intermediate brace member incorporated in the internal space to provide a reinforcement rib structure.

5 Claims, 5 Drawing Sheets

SEATBACK FRAME FOR VEHICLE SEAT

CROSS-REFERENCE TO RELATED PATENT APPLICATIONS

This is a continuation of application Ser. No. 10/097,236, filed Mar. 13, 2002 now U.S. Pat. No. 6,817,672, which claims the benefit of Japanese Patent Application No. 2001-085268, filed Mar. 3, 2001, both of which are incorporated herein by reference in their entirety.

BACKGROUND OF THE INVENTION

The present invention relates to a seatback frame for a vehicle seat and, more particularly, to a seatback frame for a vehicle seat equipped with a seat belt of the three-point type wherein a retractor for winding a seat belt is mounted at a lower portion of the seatback and allows a shoulder belt to be pulled out for restraining a seat occupant, a belt-through member is mounted at an upper distal end of the seatback for guiding the shoulder belt, fixture segments are mounted at both sides of a seat cushion for supporting both ends of a lap belt which restrains the waist of the seat occupant, and a distal end of the shoulder belt is supported with one of the fixture segments.

In general, seat belts in practical use are divided into two types, a first type in which a retractor is fixedly mounted to a pillar of a vehicle body and a second type in which the retractor is directly fixed to a seatback frame. The seat belt in normal use is constructed of a lap belt portion for restraining the waist of a seat occupant and a shoulder belt portion for restraining an area covering the shoulder and the waist of the seat occupant, which are arranged in a three-point support structure which includes lap anchor points located at both sides of a seat cushion and a shoulder anchor point located at an upper distal end of a seatback.

Since the vehicle seat, wherein the shoulder anchor point is located on the seatback frame, encounters a significantly large impact shock delivered from the shoulder belt and acting on the shoulder anchor point, it is required for the seatback frame to be reinforced. An example of such a seatback frame with a reinforced structure is exemplarily shown in FIG. 5. As shown in FIG. 5, the seatback frame 1 is comprised of a pipe frame 2 which is shaped to conform along an external shape of a seatback, and a tower frame 3 on which a belt-through member (not shown) for a shoulder anchor point is mounted. To provide a reinforced structure for the tower frame 3, particularly, a cross member 4 is obliquely placed so as to extend between an upper distal end of the tower frame 3 and a bracket 2a opposed thereto and welded to both of these components.

SUMMARY OF THE INVENTION

In the seatback frame 1 for the vehicle seat equipped with the seat belt of the related art practice, the cross member 4 located so as to extend from the upper distal end of the tower frame 3 toward the opposing side portion of the seatback frame for reinforcement has an increased weight, providing a degraded operability during a reclining operation of the seatback.

Further, the presence of the cross member 4 obliquely located in a substantially central area of the seatback so as to cross over the same encounters a difficulty in enhancing a space for locating an active-type headrest (which is of the type wherein when exerted with impact shocks, lower distal ends of the headrest stays are urged rearward to cause the headrest to move forward for thereby preventing the head of the seat occupant from being swayed rearward to protect the same). As a result, only a general-purpose headrest can only be employed in the seatback, with a difficulty in adopting the active type headrest with an increased functional property.

During rearward collisions, also, the tower frame 3 is exerted with the impact load and, so, is required to have the structure reinforced in forward and rearward directions. However, with such a reinforced structure using the cross member 4, although a rigidity is provided in structure in a widthwise direction of a vehicle body, a relatively unsatisfied result takes place in the presence of the impact shocks imparted in the forward and rearward directions of the vehicle body.

It is therefore an object of the present invention to provide a seatback frame, for a vehicle seat equipped with a three-point support type seat belt, which has a tower frame with a strong rigidity in structure sufficient for resisting impact load exerted thereto, which is lighter in weight than the related art cross member, and which enables an active type headrest to be employed. Furthermore, it is another object of the present invention to provide a vehicle seat to which such a seatback frame is applied.

According to an aspect of the present invention, there is provided a seatback frame for a vehicle seat having a seatback and a seat cushion and equipped with a seat belt of a three-point type, wherein a retractor is mounted at a lower portion of the seatback to wind up the seat belt, a belt-through member is mounted at an upper distal end of the seatback to guide a shoulder belt of the seat belt, which is pulled out from the retractor, so as to restrain a shoulder portion of a seat occupant, both ends of a lap belt of the seat belt, which restrain a waist portion of the seat occupant, are supported with fixed portions located at both sides of the seat cushion, and a distal end of the shoulder belt is further supported with one of the fixed portions. The seatback frame is provided with: a pipe frame formed along an external shape of the seatback; and a vertically extending tower frame located in the seatback at the same side as the belt-through member and fixedly connected to the pipe frame. The tower frame includes an outer side bracket, an inner side bracket, both of which are formed of vertically extending, elongated metal sheets each formed in a substantially C-shaped cross section and both of which are coupled to one another in abutting engagement with one another to form an internal space, and an intermediate brace member incorporated in the internal space to provide a reinforcement rib structure.

According to another aspect of the present invention, a vehicle seat is provided with: a seatback; a seat cushion; a seat belt of a three-point type, wherein a retractor is mounted at a lower portion of the seatback to wind up the seat belt, a belt-through member is mounted at an upper distal end of the seatback to guide a shoulder belt of the seat belt, which is pulled out from the retractor, so as to restrain a shoulder portion of a seat occupant, both ends of a lap belt of the seat belt, which restrain a waist portion of the seat occupant, are supported with fixed portions located at both sides of the seat cushion, and a distal end of the shoulder belt is further supported with one of the fixed portions; and a seatback frame. The seatback frame is provided with: a pipe frame formed along an external shape of the seatback; and a vertically extending tower frame located in the seatback at the same side as the belt-through member and fixedly connected to the pipe frame. The tower frame includes an outer side bracket, an inner side bracket, both of which are formed of vertically extending, elongated metal sheets each formed in a substantially C-shaped cross section and both of which are coupled to one another in abutting engagement with one another to form an internal space, and an intermediate brace member incorporated in the internal space to provide a reinforcement rib structure.

Other and further features, advantages, and benefits of the present invention will become more apparent from the following description taken in conjunction with the following drawings.

DETAILED DESCRIPTION OF THE PREFERRED EMBODIMENTS

To describe the present invention more in detail, a seatback frame of an embodiment of the present invention to be applied to a vehicle seat will be explained below in detail with reference to the drawings.

Figure 1:
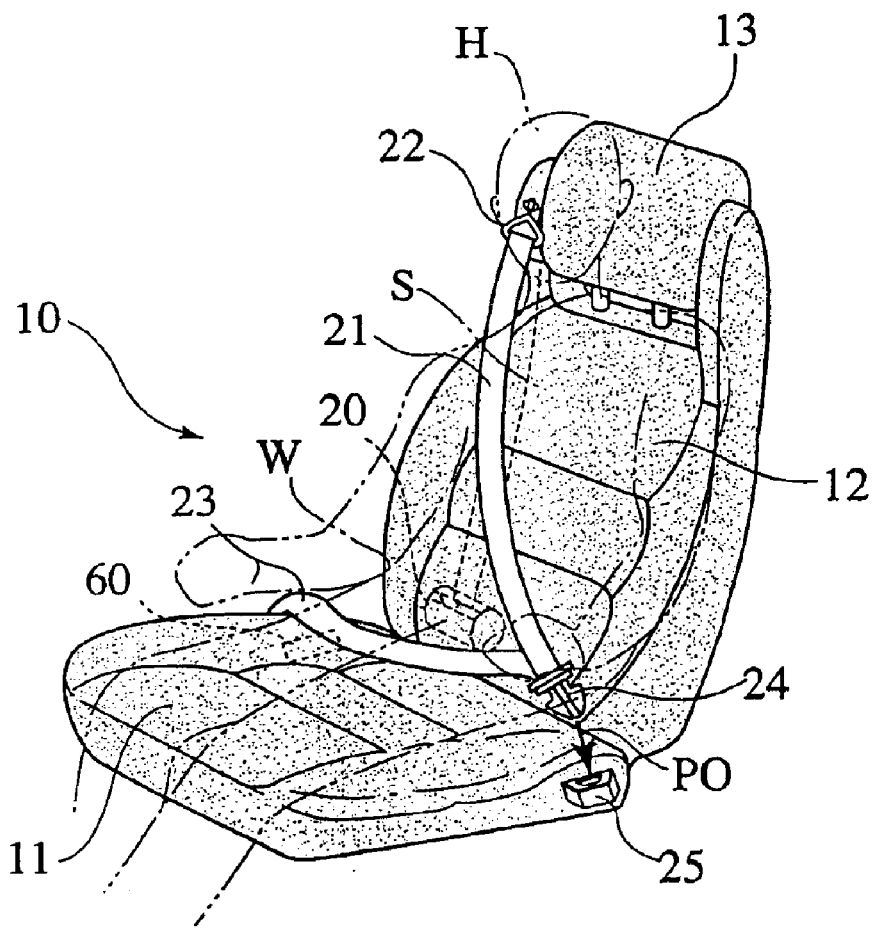
FIG. 1 is a perspective view illustrating a vehicle seat employing a seatback frame of an embodiment according to the present invention.
Figure 1:
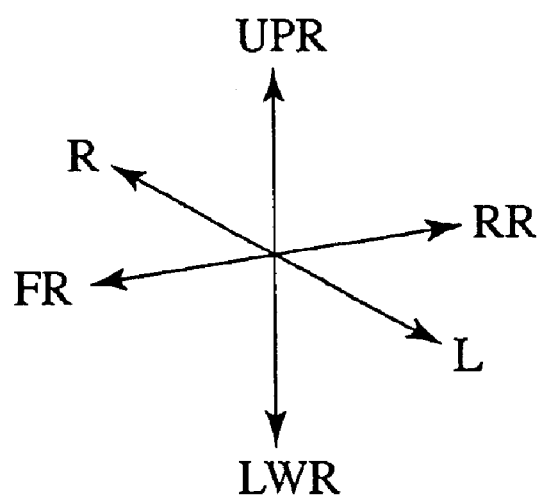
Figure 2:
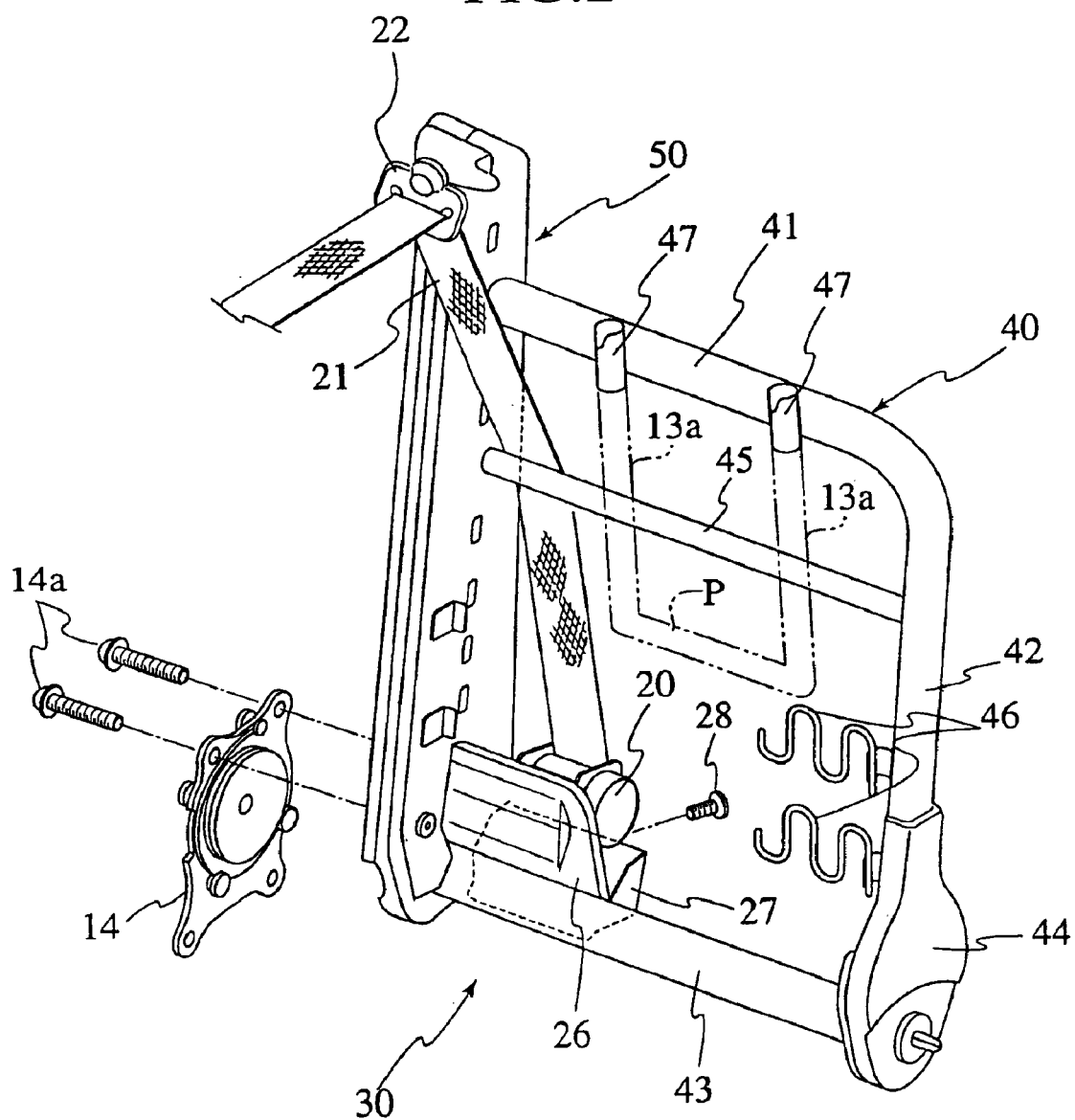
FIG. 2 is a perspective view illustrating a structure of the seatback frame of the embodiment.
Figure 2:
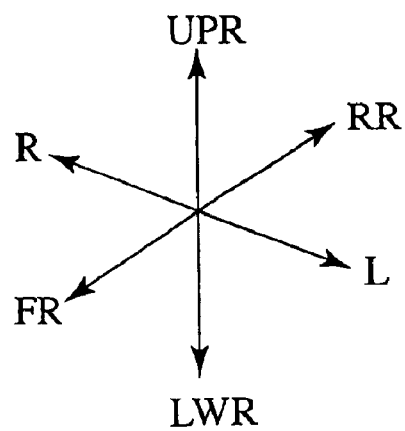
Figure 3:
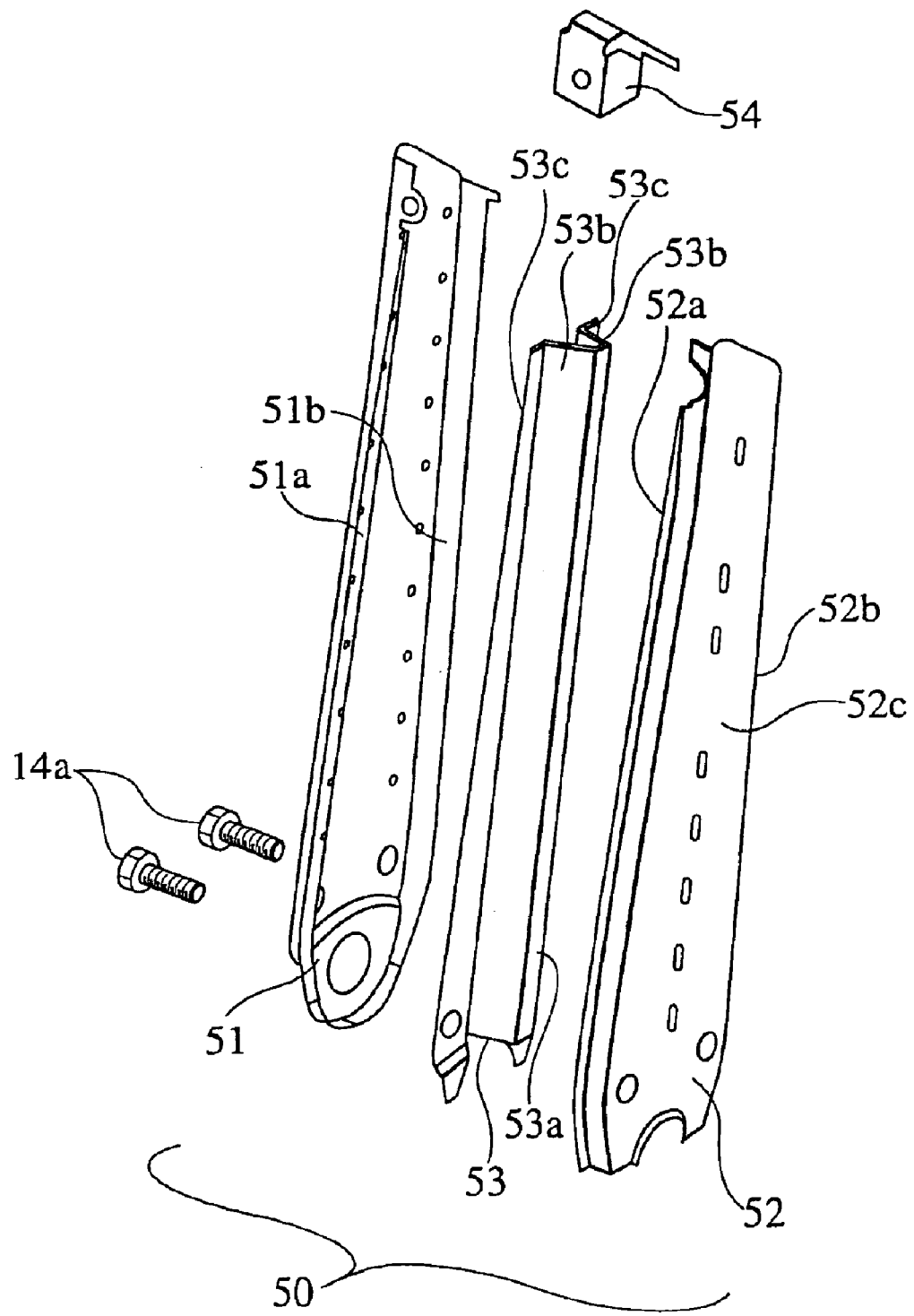
FIG. 3 is an enlarged exploded view of a tower frame forming part of the seatback frame shown in FIG. 2.
Figure 4A:
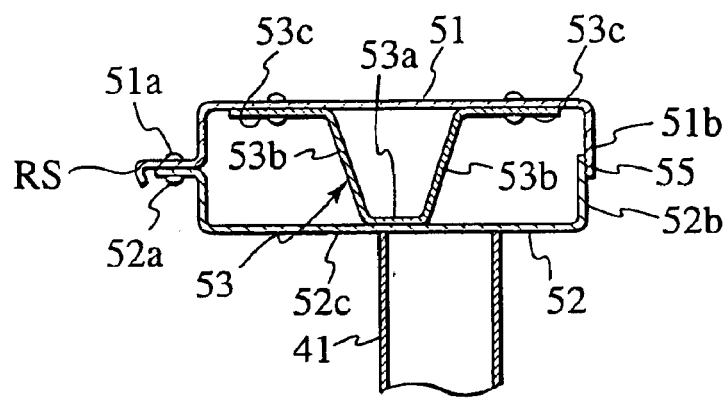
FIG. 4A is a cross sectional view illustrating a mounting area of an upper pipe component.
Figure 4B:
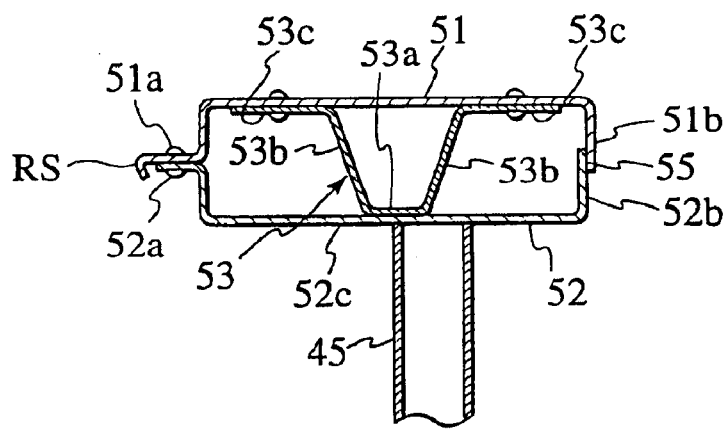
FIG. 4B is a cross sectional view illustrating a mounting area of a center pipe component.
Figure 4C:
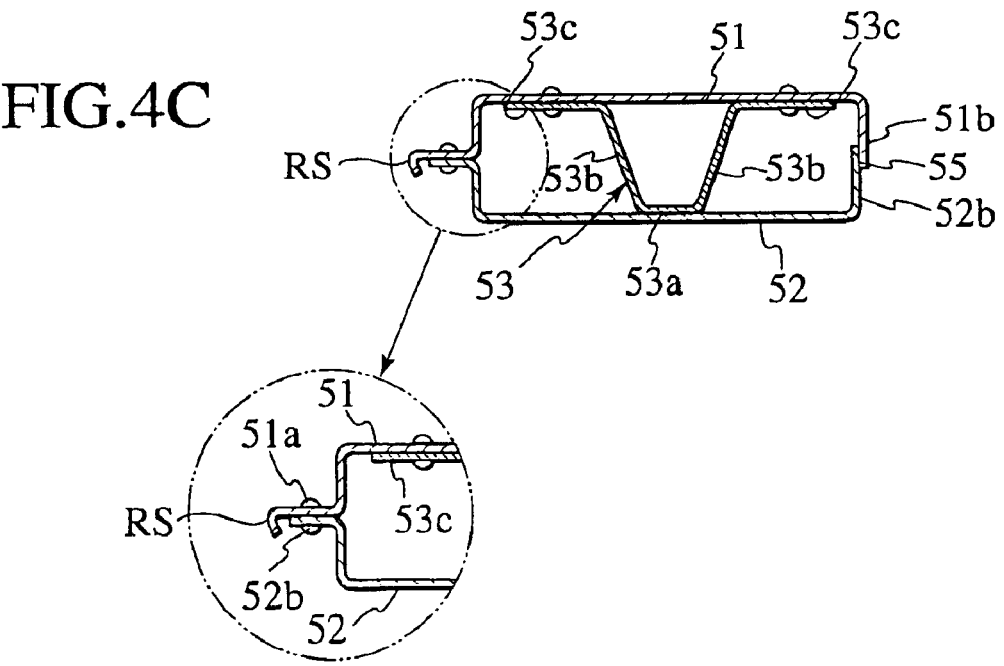
FIG. 4C is a cross sectional view illustrating a structural configuration of the tower frame.
Figure 5:
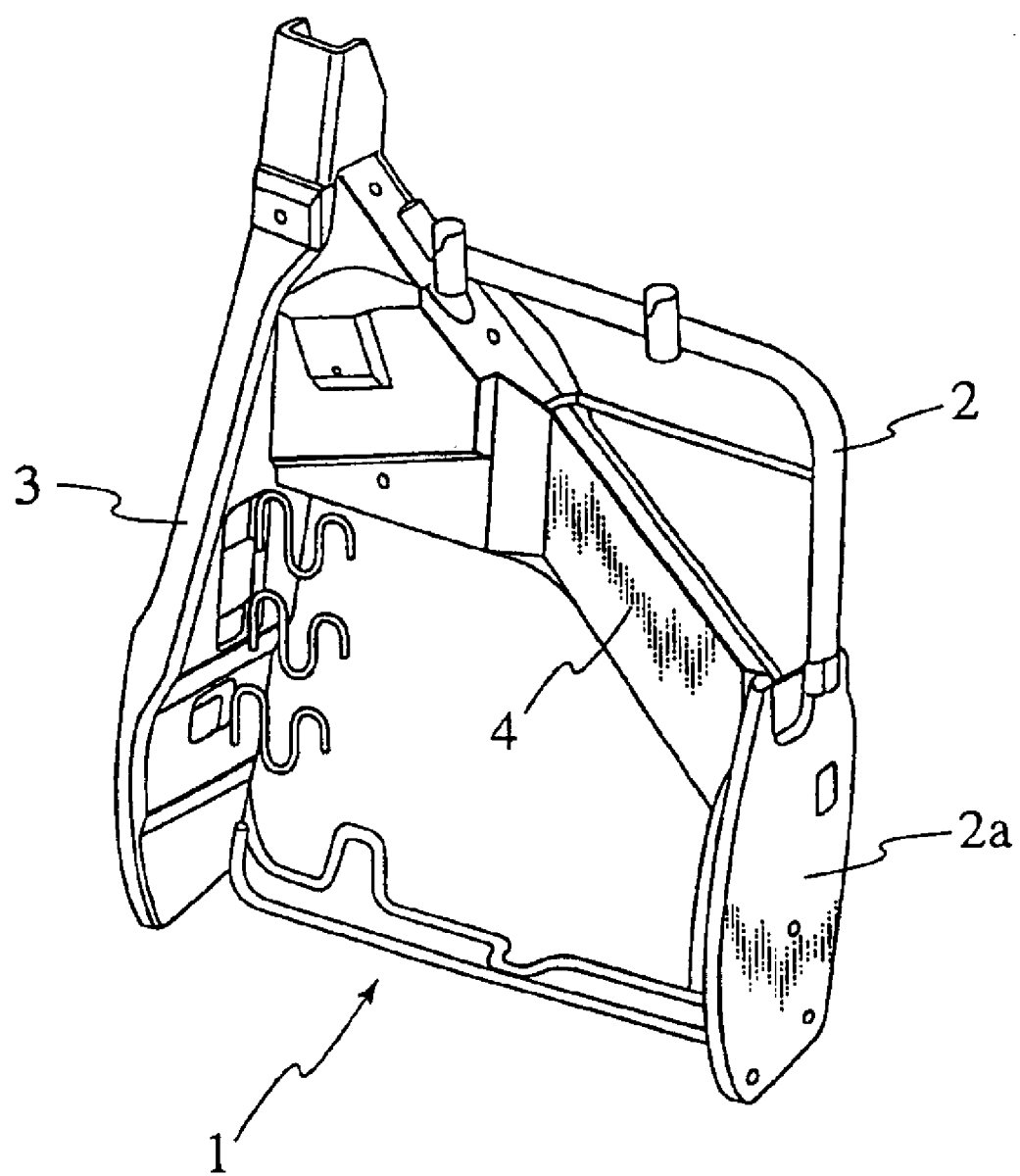
FIG. 5 is a perspective view of a seatback frame for a unitary type seat assembled with a seat belt used in the related art practice.

FIG. 1 is a perspective view of the vehicle seat employing the seatback frame according to the present invention. FIG. 2 is a perspective view illustrating a structure of the seatback according to the present invention. FIG. 3 is an exploded perspective view illustrating a structure of a tower frame which forms the seatback frame shown in FIG. 3. FIGS. 4A, 4B and 4C are cross sectional views illustrating the tower frame, shown in FIG. 3, in conjunction with associated component parts shown in FIG. 2. In the Figures, frontward and rearward directions of a vehicle body are respectively represented by arrows FR and RR, rightward and leftward directions of the vehicle body are respectively represented by arrows R and L, upward and downward directions of the vehicle body are respectively represented by arrows UPR and LWR, and a right side front seat is typically illustrated.

In FIG. 1, the vehicle seat 10 is equipped with a seat belt of a three-point support type and includes a seat cushion 11 on which a seat occupant seats, a seatback 12 standing upright from a rear distal end of the seat cushion 11 through a reclining mechanism operatively coupled to the seat cushion 11 and the seatback 12 permitting the seatback 12 to be adjusted in a reclined state at a given angular position, and a headrest 13 fixedly located at an upper edge of the seatback 12 for supporting an head H of a seat occupant.

A seat belt equipped in the vehicle seat 10 is comprised of a first retractor 20 internally incorporated in a lower side portion of the seatback 12 and fixedly secured to the vehicle body side, and a shoulder belt 21 with its one lowest end portion stored in the first retractor 20 and having an intermediate portion passing through a belt-through member 22 fixedly secured to an upper distal end of the seat back 12. When applying the seat belt, the seat occupant pulls out the shoulder belt 21 downward in an oblique direction through the belt-through member 22 so as to restrain a shoulder S of the seat occupant.

Further, the seat belt includes a lap belt 23 with its one end stored in a second retractor 60, which is fixedly secured to the vehicle body side at a lower side of the seat cushion 11, to allow free movement of the lap belt 23 for restraining a waist W of the seat occupant, with the other end of the lap belt 23 being firmly connected to a lower distal end of the shoulder belt 21. The ends of the shoulder belt 21 and the lap belt 23 are tightly connected to a coupling tongue 24 which can be fixedly coupled to a release buckle 25 fixedly mounted to the other side of the seat cushion 11, providing a three-point support structure wherein the shoulder belt 21 and the lap belt 23, which form a waving configuration of the seat belt, are supported at a fixed point lying on the belt-through member 22, located at the upper distal end of the seatback 12, and at two fixed points lying on both sides of the seat cushion 11. In FIG. 1, a pulling-out direction of the shoulder belt 21 and the lap belt 23 is designated by an arrow PO. Incidentally, as appropriate, the second retractor 60 can be replaced with a pivotably fixed member. In such a simple structure, an end of the lap belt 23 opposed to the coupling tongue 24 is simply connected to the pivotably fixed member and not wound around to be elongated.

FIG. 2 shows a structure of the seatback frame 30 of the seatback 12. In FIG. 2, the seatback frame 30 is formed by bending a pipe material and is generally comprised of a substantially L-shaped pipe frame 40 and a tower frame 50 located at one side of the seatback 12 and vertically extending to provide a reinforced rigid structure.

More particularly, the pipe frame 40 includes a horizontally extending upper pipe component 41, a side pipe component 42 which is laterally spaced from the tower frame 50, and a horizontally extending lower pipe component 43. These components are so shaped as to conform to an upper edge, one of side edges and a lower edge, respectively, which form three sides of an external shape of the seatback 12. A side bracket 44 is fixedly secured to a lower distal end of the side pipe component 42 by some suitable means such as welding. Located below the upper pipe component 41 is a center pipe component 45 which transversely extends between the side pipe component 42 and the tower frame 50 to reinforce the structure of the seatback frame 30.

Below the center pipe component 45, further, S-shaped springs 46 are supported between the side pipe component 42 and the tower frame 50. Also, the upper pipe component 41 of the pipe frame 40 has a pair of guide sleeves 47 fixedly connected thereto by welding for receiving stays 13a, 13a of the headrest 13.

As seen in FIG. 2, the first retractor 20 is received in a joined area between one end of the lower pipe component 43 of the pipe frame 40 and a lower distal end of the tower frame 50 and is fixedly secured to a pair of brackets 26, 27, fastened to the lower pipe component 43 by a welding, by tightening screws 28. Also, a recliner 14, which forms the reclining mechanism discussed above, is fixedly coupled to a lower and side wall of the tower frame 50 by fixture bolts 14a.

One feature of the seatback frame 30 of the present invention concerns a capability of contributing to a reduction in weight and an increase in rigidity in structure to have a strength sufficient for resisting impact shocks exerted to the seatback 12 during a collision of a vehicle while adequately enhancing a space permitting free movement of an active-type headrest 13 having an impact shock absorbing ability.

That is, as shown in FIG. 3, the tower frame 50 is constructed of an outer side bracket 51 formed of a vertically extending, elongated metal sheet, an inner side bracket 52 formed of a vertically extending, elongated metal sheet, and an intermediate, elongated brace member 53 with a reinforcement rib function which is interposed between the outer and inner side brackets 51, 52. Also, reference numeral 54 designates a cap and bracket to be coupled to an upper opening of the tower frame 50.

As seen in FIG. 3, each of the outer side bracket 51 and the inner side bracket 52 has a substantially C-channeled configuration in cross section. The outer and inner side brackets 51, 52 have their front edges formed with front flanges 51a, 52a, respectively. Besides, rear sections of the outer side bracket 51 and the inner side bracket 52 are formed with vertically extending, elongated rear walls 51b, 52b. Further, the intermediate brace member 53 is composed of a vertically extending, elongated central top wall 53a, a pair of elongated longitudinal wall segments 53b, 53b bent sideward from both sides of the top wall 53a, and vertically extending, elongated front and rear flanges 53c, 53c which extends from front and rear edges of the respective longitudinal wall segments 53b, 53b in forward and rearward directions of the seatback 12.

As viewed in FIGS. 4A to 4C which show the relationships among the outer side bracket 51, the inner side bracket 52 and the intermediate brace member 53, the rear walls 51b and 52b formed along the rear sections of the outer side bracket 51 and the inner side bracket 52, respectively, have overlapped margin 55, extending in a vertical direction, at which the rear walls 51b and 52b are joined to one another with suitably spaced welding intervals by some suitable welding means such as $CO_2$ welding.

In addition, the front flanges 51a, 52a formed along the front edges of the outer side bracket 51 and the inner side bracket 52, respectively, are held in mating engagement with one another and are fixedly joined to one another with suitably spaced welding intervals by some suitable welding means from the vertical direction such as spot welding. As a result, any unbalances present in a mated condition between the both side brackets can be overcome by adjusting the joint margin 55 of the respective rear walls 51b, 52b of the side brackets 51, 52. Further, the above joining method for the side brackets 51, 52 provides a highly improved workability in the welding operation of the tower frame 50 in the seatback frame 30.

Located in an internal space between the outer side bracket 51 and the inner side bracket 52 is the intermediate brace member 53, whose top wall 53a is joined to the inner surface of the inner side bracket 52 with vertically spaced welding intervals by welding and the front and rear flanges 53c, 53c are joined to an inner surface of the outer side bracket 51 with vertically spaced welding intervals by welding such that the longitudinal wall segments 53b, 53b constitute rib structures.

As viewed in FIG. 4A, a distal end of the upper pipe component 41 is joined to a laterally and inwardly facing vertical wall 5c, of the inner side bracket 52, to which a distal end of the center pipe component 45 is also connected by welding (see FIG. 4B). In addition, a distal end of the lower pipe component 43 is connected to a lower end of the vertical wall 5c (see FIG. 2).

With a configuration discussed above, the seatback frame 30 has a reinforced structure with the tower frame 50 containing the intermediate brace member 53 while, in addition thereto, the center pipe component 45 and the lower pipe components 43 laterally extend between the side pipe component 42 and the tower frame 50. In particular, the seatback frame 30 utilizes the longitudinal wall segments 53b of the intermediate brace member 53, contained in the tower frame 50, as the reinforced member for the joint portions between the upper pipe component 41 and the center pipe component 45. Therefore, even when the connected areas of the upper pipe component 41 and the center pipe component 45 encounter the impact load, the connected areas are not deformed. Thus, the seatback frame 30 has an effective function to resist the impact load or stress exerted to the seatback 12 in a widthwise direction of the vehicle, precluding a buckling deformation to be caused in the tower frame 50 while enabling the tower frame 50 to have a strong rigidity and an increased durability in the whole structure of the seatback 12.

Also as previously noted above, the seatback frame 30 has a reinforced function effective for overcoming bending load exerted to the seatback 12 in the forward and rearward directions of the vehicle owing to the joint portion between the inner side bracket 52 and the upper pipe component 41 shown in FIG. 4A, the joint portion between the inner side bracket 52 and the center pipe component 45 shown in FIG. 4B, and the closed box-shaped structure of the tower frame 50 as well as the joined structure between the vertically extending front flanges 51a, 52a which are welded together. In addition, one of the front flanges 51a, 52a of the outer side bracket 51 and the inner side bracket 52 is bent or curled to have a round shape RS, thereby preventing a seat pad and a decorative seat cover, which conceals the seatback frame, from being damaged such that it is possible for the seatback to maintain a favorable operating performance with a comfortable feeling and an outer appearance. Also, the provision of the center pipe component 45 located in the area to compel the center pipe component 45 to avoid interference with an impact receiving portion P of the stays 13a, 13a of the headrest 13 enables the headrest 13 to be structured as the active type.

Furthermore with such a structure discussed above, when encountering traffic accidents such as rearward collisions of the vehicle, the impact force imparted to the seat occupant is transferred through the shoulder belt 21 and is then applied through the belt-through 22 to the tower frame 50 of the seatback frame 30. When this occurs, the favorable degree of the reinforced structure in rigidity provided by the specific configuration of the seatback frame 30 including the joined structure of the front flanges 51a, 52a or the like is effective for adequately overcoming the impact load exerted in the forward and rearward directions of the vehicle to preclude a fear of bending deformation.

It will now be understood from the foregoing description that one key feature of the seatback frame for the vehicle seat of the present invention concerns the structure constructed of the pipe frame, which is formed in the same shape as the external shape of the seatback, and the vertically extending tower frame located at one side of the seatback, together with the tower frame, which supports the shoulder belt to be pulled out from the retractor mounted at the lower part of the seatback, including the intermediate brace member located in the internal space formed by the outer side bracket and the inner side bracket, which are fixedly joined to one another, to provide the reinforced structure whereby even when the vehicle encounters the collision in the widthwise or forward and rearward directions, the tower frame is not subjected to the buckling phenomenon while enabling the provision of the light weight and compact structure.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A seatback frame for a vehicle seat having a seatback and a seat cushion and equipped with a seat belt of a three-point type, wherein a retractor is mounted at a lower portion of the seatback to wind up the seat belt, a belt-through member is mounted at an upper distal end of the seatback to guide a shoulder belt of the seat belt, which is pulled out from the retractor, so as to restrain a shoulder portion of a seat occupant, both ends of a lap belt of the seat belt, which restrain a waist portion of the seat occupant, are supported with fixed portions located at both sides of the seat cushion, and a distal end of the shoulder belt is further supported with one of the fixed portions, the seatback frame comprising:

a pipe frame formed along an external shape of the seatback; and a vertically extending tower frame located in the seatback at the same side as the belt-through member to extend beyond the pipe frame, one end of the pipe frame being fixed to the tower frame, wherein the tower frame includes an outer side bracket and an inner side bracket, the outer side bracket is formed of vertically extending, elongated metal sheets formed in a substantially C-shaped cross section opening toward an inner side of the seatback frame, the inner side bracket is formed of vertically extending, elongated metal sheets formed in a substantially C-shaped cross section opening toward an outer side of the seatback frame, the outer side bracket and the inner side bracket are coupled to one another in abutting engagement with one another to form an internal space by closing the C-shaped cross section of the outer side bracket and the C-shaped cross section of the inner side bracket, and an intermediate brace member incorporated in the internal space to provide a reinforcement rib structure that is provided by connecting the intermediate brace member with the tower frame such that the intermediate brace member extends along the outer and inner side brackets to define a closed section therebetween.

2. A seatback frame for a vehicle seat according to claim 1, further comprising a center pipe component interconnected between the pipe frame and the tower frame.

3. A seatback frame for a vehicle seat according to claim 2, wherein the center pipe component is arranged to avoid interfering with stays of a headrest of an active type.

4. A seatback frame for a vehicle seat according to claim 2, wherein an upper pipe component of the pipe frame and the center pipe component have their respective distal ends welded to the inner side bracket at the reinforcement rib structure of the intermediate brace member.

5. A vehicle seat comprising:

a seatback;

a seat cushion;

a seat belt of a three-point type, wherein a retractor is mounted at a lower portion of the seatback to wind up the seat belt, a belt-through member is mounted at an upper distal end of the seatback to guide a shoulder belt of the seat belt, which is pulled out from the retractor, so as to restrain a shoulder portion of a seat occupant, both ends of a lap belt of the seat belt, which restrain a waist portion of the seat occupant, are supported with fixed portions located at both sides of the seat cushion, and a distal end of the shoulder belt is further supported with one of the fixed portions; and a seatback frame having:

a pipe frame formed along an external shape of the seatback; and a vertically extending tower frame located in the seatback at the same side as the belt-through member to extend beyond the pipe frame, one end of the pipe frame being fixed to the tower frame, wherein the tower frame includes an outer side bracket and an inner side bracket, the outer side bracket is formed of vertically extending, elongated metal sheets formed in a substantially C-shaped cross section opening toward an inner side of the seatback frame, the inner side bracket is formed of vertically extending, elongated metal sheets formed in a substantially C-shaped cross section opening toward an outer side of the seatback frame, the outer side bracket and the inner side bracket are coupled to one another in abutting engagement with one another to form an internal space by closing the C-shaped cross section of the outer side bracket and the C-shaped cross section of the inner side bracket, and an intermediate brace member incorporated in the internal space to provide a reinforcement rib structure that is provided by connecting the intermediate brace member with the tower frame such that the intermediate brace member extends along the outer and inner side brackets to define a closed section therebetween.

* * * * *